(No Model.)
M. CONRAD.
WAGON AXLE.
No. 576,302. Patented Feb. 2, 1897.
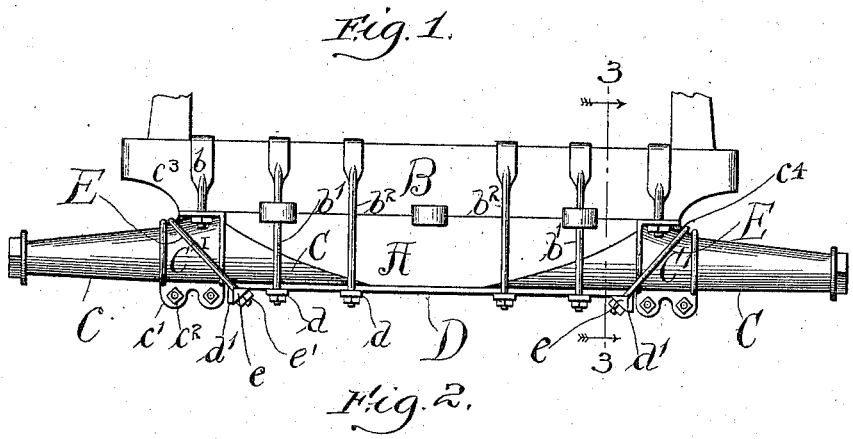
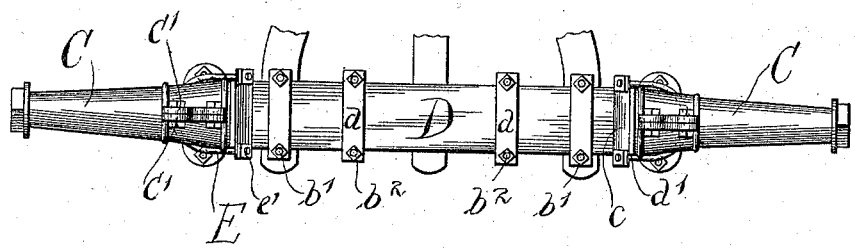
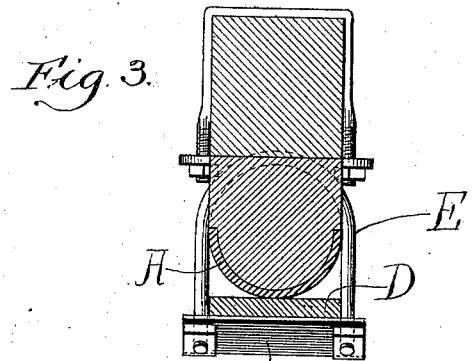
Witnesses
W. C. Coolies
Martin H. Olsen
Inventor
Martin Conrad
—by—
Poole & Brown
—his Attorneys

UNITED STATES PATENT OFFICE.

MARTIN CONRAD, OF CHICAGO, ILLINOIS.

WAGON-AXLE.

SPECIFICATION forming part of Letters Patent No. 576,302, dated February 2, 1897.

Application filed July 2, 1896. Serial No. 597,823. (No model.)

*To all whom it may concern:*

Be it known that I, MARTIN CONRAD, of Chicago, in the county of Cook and State of Illinois, have invented certain new and useful Improvements in Wagon - Axles; and I do hereby declare that the following is a full, clear, and exact description thereof, reference being had to the accompanying drawings, and to the letters of reference marked thereon, which form a part of this specification.

This invention relates to improvements in the construction of wagon-axles of that kind in which the body of the axles is of wood and is provided with metal axle-skeins.

The object of the invention is to provide a metal reinforcing-piece by which the axle is trussed or given greater stiffness and strength; and it consists in the matters hereinafter described, and pointed out in the appended claims.

In the accompanying drawings, illustrating my invention, Figure 1 is a view in side elevation of a wagon-axle and bolster embodying my invention. Fig. 2 is a view of the axle as seen from beneath. Fig. 3 is a cross-section of the axle, taken on line 3 3 of Fig. 1.

As shown in said drawings, A indicates the axle, and B the bolster, which rests upon and is secured to the axle in a familiar manner.

C C indicate the axle-skeins, which in the particular instance illustrated are prolonged or extended beneath the axle toward the center thereof, as seen at $c$ $c$, and are provided at their inner ends with collars formed by means of split sleeves $C'$, which embrace the parts of the axle adjacent to the axle-arms and are split beneath the axle and provided with depending flanges or lugs $c'$ $c'$, through which are inserted clamping-bolts $C^2$ $C^2$, by which the sleeves are clamped to the skeins. Said sleeves $C'$ are shown as being also provided with lateral flanges $c^3$ at their upper margins, through which are inserted the ends of the clips $b$, which embrace the end portions of the bolster.

D indicates a truss-bar which is placed in contact with the lower surface of the axle and terminates at its ends adjacent to the sleeves $C'$ $C'$. Said bar D is made flat and of considerable width, so as to have a broad bearing-surface, which rests against the lower surface of the axle and is held or clamped to the axle by a plurality of clips $b'$ $b'$ $b^2$ $b^2$, located at intervals along the bar and axle, said clips being herein shown as arranged to embrace also the bolster B. At their lower ends said clips are engaged with cross-bars $d$ $d$, which are located in contact with the lower surface of the truss-bar D and extend beyond the side edges of the same far enough to receive the lower ends of the said clips. The extremities of the said bar D are bent outwardly or downwardly to form the holding lugs or projections $d'$ $d'$. The ends of said truss-bar D are connected with skeins by means of obliquely-arranged U-shaped tie-rods E E, which extend around the outer parts of the sleeves $C'$ $C'$ and are engaged at their ends with cross-bars $e$ $e$, which bear against the ends of the truss-bar and the lugs thereon and extend at their ends beyond the sides of the truss-bar. The ends of the said cross-bars are provided with holes for the passage of the ends of the tie-rods, and the latter are provided with nuts $e'$, by which they are adjustably secured to said cross-bars. Said cross-bars $e$ $e$ are preferably made of triangular form and have flat or oblique faces, against which the holding-nuts of the tie-rods rest or bear, as clearly shown in the drawings.

The central part or loops of the tie-rods engage shoulders $c^4$, formed in the outer and upper parts of the sleeves $C'$, said shoulders being formed, in the particular construction shown, by means of the upward extensions of the sleeves, which join the flanges $c'$ with the main parts of the sleeves.

The truss-bar, held by clips against the lower surface of the axle and secured at its ends to the skeins by obliquely-arranged tie rods or clips, which engage shoulders on the upper parts of the skeins, as above described, gives great additional strength to the axle without greatly increasing its cost or weight. The axle thus constructed constitutes, in effect, a truss, of which the flat bar D (preferably made of steel) forms the lower tension member or cord, while the axle itself forms the upper or compression member. Moreover, the said bar being rigidly secured by clips against the lower surface of the axle, said axle in itself also constitutes the strut or king-post of the truss. It follows that great strength is given to the axle, because it becomes impossible to rupture the same at the bottom and the upper portion can only be broken by compression, which would require a power much greater than the transverse strength of the axle proper.

I claim as my invention—

1. A wagon-axle comprising a wooden part or body, metal skeins attached to the ends of the body and provided with shoulders at their upper surfaces, a flat metal truss-bar secured by clips against the lower surface of the axle and obliquely-arranged tie-rods engaging the shoulders of the skeins and connected with the ends of said bar, substantially as described.

2. The combination with a wooden axle, of metal skeins secured to the ends of the same and provided with shoulders at their upper surfaces, a flat metal truss-bar in contact with the lower surface of the axle, said bar being secured to the axle by clips arranged at intervals along the same, and oblique tie-rods engaging the said skeins and the ends of the bar, said ends of the bar being bent downwardly to form holding-lugs and the ends of the tie-rods being engaged by cross-bars, which engage said lugs, substantially as described.

3. The combination with a wooden axle, of metal skeins attached to the ends of said axle, and provided with shoulders at their upper surfaces, a flat metal truss-bar in contact with the lower surface of the axle, clips connecting the bar with the axle, arranged at intervals along the same, oblique tie-rods engaging the shoulders of the skeins and cross-bars engaging the ends of the truss-bar, said cross-bar having holes in its ends for the passage of said tie-rods and an oblique bearing-surface for the nuts on the ends of said tie-rods, substantially as described.

In testimony that I claim the foregoing as my invention I affix my signature, in presence of two witnesses, this 30th day of June, A. D. 1896.

MARTIN CONRAD.

Witnesses:
   C. CLARENCE POOLE,
   WILLIAM L. HALL.